2,700,040
Patented Jan. 18, 1955

2,700,040

AMINOALKYLAMINOISOQUINOLINES

Glenn E. Ullyot, Philadelphia, Pa., assignor to Smith, Kline & French Laboratories, Philadelphia, Pa., a corporation of Pennsylvania No Drawing. Application May 21, 1951, Serial No. 227,509

6 Claims. (Cl. 260—286)

This invention relates to certain new chemical compounds comprising certain aminoalkylaminoisoquinoline derivatives possessing physiological activity and, more particularly, finding utility as antifibrillatory agents. Broadly, the chemical compounds of this invention will comprise the free bases and the acid addition salts thereof, the free bases having the following structure:

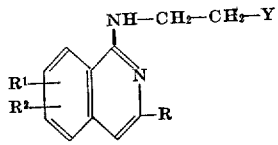

in which:
Y is a nitrogen atom of an amino radical selected from the group consisting of di-lower-alkylamino, and 5- and 6-membered heterocyclicamino radicals.
R is selected from the group consisting of lower alkyl, phenyl and benzyl radicals, and
$R^1$ and $R^2$ are selected from the group consisting of H, methyl, lower alkoxy, amino, methylamino and acetylamino radicals.

This invention also contemplates the organic and inorganic salts of the above compounds.

It will be appreciated from the above definition that the compounds contemplated by this invention include the aminoalkylaminoisoquinoline derivatives defined above and their organic and inorganic acid salts, which latter will be readily prepared from the former by methods well known to the art using, for example, but not by way of limitation, phosphoric, hydrochloric, hydrobromic, sulfuric, and the like, succinic, benzoic, tartaric, and the like.

As has been indicated, the salts contemplated by this invention will be prepared from the basic compounds, for example, by mixing the basic compounds, which are variously oils, liquids or solids, depending upon the nature of the groups attached to the isoquinoline nucleus, with the organic or inorganic acid desired to be used, either directly or in the presence of a suitable solvent, such as alcohol, water, ether, benzene, or the like. Variously the salt will precipitate directly and can be collected on a filter. In other instances, it will be necessary to remove the solvent by distillation and dry the salt product by warming in vacuo.

Generally speaking, where the compounds in accordance with this invention are used as therapeutic agents, the salts will be preferred for such use.

The starting materials required for the preparation of the compounds in accordance with this invention as defined above are known to the art or may be readily prepared by known methods.

More particularly, the starting materials consist of isoquinoline derivatives represented by the formulae:

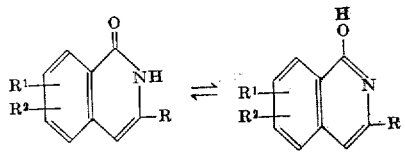

where R, $R^1$ and $R^2$ are as defined above, and aminoalkylamines represented by $Y-CH_2-CH_2-NH_2$ where Y is as defined above.

The required isoquinoline derivatives as illustrated by the above formulae may, for example, be prepared according to the methods described in the literature, as, for example, Gabriel and Colman, Ber., 33, 905 (1900) and Gabriel and Newman, Ber., 25, 3569 (1892); and as described in applications for United States patents heretofore filed by me, i. e., Serial No. 116,866, now Patent No. 2,642,431, and Serial No. 116,868, now Patent No. 2,538,342. The diaminoethanes required are well known or the preparation of any particular amine required by well known methods will be obvious to those skilled in the art.

Generally speaking, the compounds in accordance with this invention will be prepared by treating the isoquinoline derivatives defined above with, for example, an excess of phosphorus oxychloride to produce the corresponding 1-chloroisoquinoline derivatives and which will have the following structure:

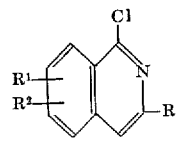

where R, $R^1$ and $R^2$ are as defined above.

This reaction will, for example, be effected by placing the isoquinoline derivatives in a suitable flask, adding one to three molar equivalents of phosphorus oxychloride and heating under a reflux condenser until the evolution of hydrogen chloride ceases. The excess phosphorus oxychloride is then removed by distillation and the product purified by distillation in vacuo, or, alternatively the reaction mixture may be poured into ice water, the mixture neutralized by the addition of alkali and the product isolated by extraction with a solvent, drying and distillation. If desired, this reaction may be carried out in the presence of a solvent, such as benzene, toluene, or the like.

By way of further illustration, the 1-chloroisoquinoline compounds used as starting materials will be prepared from the corresponding isocarbostyrils by the action of phosphorus oxychloride, by the general method, of, for example, Gabriel and Colman, referred to above. By way of example, 56 g. of 3-n-butylisocarbostyril in 86 g. of phosphorus oxychloride is refluxed for 16 hours, cooled and poured into 300 g. of cracked ice. The cold solution is carefully neutralized with sodium hydroxide and the product is extracted with ether. After drying over anhydrous sulfate the ether is removed and the product distilled. This product will boil at 155–158°/6 mm. pressure. The several other isoquinoline compounds will be made in an exactly analogous manner.

As further illustrative, the following 1-chloroisoquinoline compounds may be mentioned:

1-chloroisoquinoline; B. P. 114–116°/9 mm.; M. P. 31° C.
1-chloro-3-methylisoquinoline; B. P. 108–110°/1 mm.; M. P. 32°.
1-chloro-3-ethylisoquinoline; B. P. 148–150°/10 mm.; M. P. 26°.
1-chloro-3-propylisoquinoline; B. P. 157–161°/9 mm.
1-chloro-3-butylisoquinoline; B. P. 155–158°/6 mm.

The preparation of nuclear 1-chloroisoquinoline intermediates will be illustrated and made clear by the following example:

One hundred grams of 6,7-dimethoxy-3-ethylisocarbostyril is dissolved in 190 g. of phosphorus oxychloride and refluxed for 18 hours. The solution is cooled and poured into cracked ice. After neutralization of the decomposed reaction mixture with potassium hydroxide, the product, 1-chloro-6,7-dimethoxy-3-ethylisoquinoline, is isolated by ether extraction in the usual manner.

Generally speaking, the compounds in accordance with this invention will be prepared by reacting the 1-chloroisoquinoline derivatives as defined above, with the aminoalkylamine according to the following general reaction:

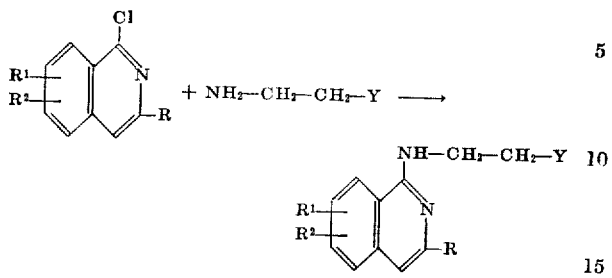

where R, R¹, R², and Y are as defined above.

The 1-chloroisoquinoline and the appropriate aminoethylamine are refluxed together for several hours in the presence of a condensing agent as e. g., copper or zinc usually in the presence of a suitable solvent such as e. g., xylene, benzene, and toluene. Upon completion of the reaction, the reflux mixture is made alkaline with an excess of an alkali metal hydroxide as e. g., sodium hydroxide or potassium hydroxide and the oil so formed is extracted into a suitable solvent such as ether. Distillation of the ether solution removes the volatile solvent and prepares the free base, which may be isolated in that form or converted to the acid addition salt by the introduction of anhydrous hydrogen chloride or aqueous hydrobromic acid. The crystalline product so formed may be purified by recrystallization from a suitable solvent such as alcohol, acetone or water.

As more specifically illustrative of the preparation of the compounds contemplated by this invention will be the preparation of the following specific compounds which will serve to exemplify the preparation of all such compounds since they will be prepared in the same manner with the selection of appropriate starting materials to the production of the particularly desired specific product.

EXAMPLE 1

*1-(β-diethylaminoethylamino)-3-ethylisoquinoline dihydrochloride*

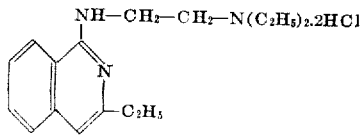

A mixture of 19.2 g. of 1-chloro-3-ethylisoquinoline, 28.5 g. of β-diethylaminoethylamine and 1 g. of copper powder was refluxed for 2 hours. The resulting mixture was made alkaline with excess potassium hydroxide and the oil which formed was extracted into ether. Distillation yielded a product, B. P. 189–191°/5 mm. The dihydrochloride was formed with anhydrous hydrogen chloride and crystallized from alcohol-acetone; M. P. 211–213°.

EXAMPLE 2

*1-(β-diethylaminoethylamino)-3-methylisoquinoline dihydrochloride*

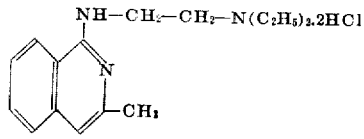

A solution of 20 g. of 1-chloro-3-methylisoquinoline and 26.6 g. of β-diethylaminoethylamine in 15 cc. of dry xylene was heated at gentle reflux for four hours. The resulting red solution was cooled to 25° and extracted with three 50 cc. portions of water. The organic layer was dried over anhydrous sodium sulfate. The sodium sulfate was removed by filtration, washed with ether and then the solvent was removed by distillation in vacuo. Distillation of the residual oil gave 21 g. of a yellow liquid; B. P. 165°/1 mm. The dihydrochloride was prepared in ether and crystallized from alcohol-acetone; M. P. 251–252°.

EXAMPLE 3

*1-(β-diethylaminoethylamino)-3-propylisoquinoline dihydrochloride*

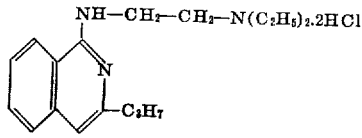

A mixture of 20.6 g. of 1-chloro-3-n-propylisoquinoline, 28.5 g. of β-diethylaminoethylamine and 1 g. of copper powder was heated at reflux temperature for 5 hours. The resulting mixture was made alkaline with excess aqueous potassium hydroxide and the oil which formed was extracted into ether. Distillation yielded a product; B. P. 206°/11:5 mm., $n_D^{21}$ 1.5927. The dihydrochloride was precipitated with excess anhydrous hydrogen chloride and crystallized from alcohol-acetone, M. P. 207–209°.

EXAMPLE 4

*1-(β-diethylaminoethylamino)-3-n-butylisoquinoline*

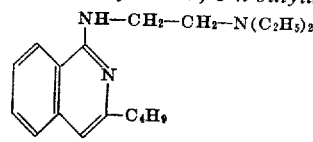

A mixture of 12.8 g. of β-diethylaminoethylamine and 11.0 g. of 1-chloro-3-n-butylisoquinoline in 50 cc. of dry xylene was heated at reflux temperature for 16 hours. The resulting solution was cooled to room temperature and extracted with dilute hydrochloric acid. The acid extract was made basic with excess alkali and the oil which formed was extracted into ether. After washing with water the ether was removed and the product distilled; B. P. 168–170° at 0.3 mm., $n_D^{23}$ 1.5627.

EXAMPLE 5

*1-(β-dimethylaminoethylamino)-3-phenylisoquinoline dihydrochloride*

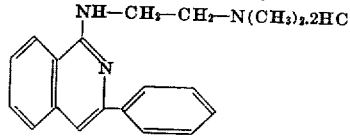

This compound was prepared using a procedure identical with that of Example 2, with the exception that an equimolar quantity of 1-chloro-3-phenylisoquinoline was utilized instead of 1-chloro-3-methylisoquinoline and refluxed together with an equimolar quantity of β-dimethylaminoethylamine instead of β-diethylaminoethylamine

EXAMPLE 6

*1-(β-dimethylaminoethylamino)-3-benzylisoquinoline dihydrochloride*

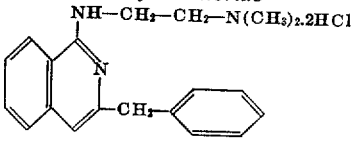

This compound was prepared using a procedure identical with that of Example 2, with the exception that an equimolar quantity of 1-chloro-3-benzylisoquinoline was utilized instead of 1-chloro-3-methylisoquinoline and refluxed together with an equimolar quantity of β-dimethylaminoethylamine instead of β-diethylaminoethylamine.

EXAMPLE 7

*1-(β-di-n-propylaminoethylamino)-3-benzylisoquinoline dihydrochloride*

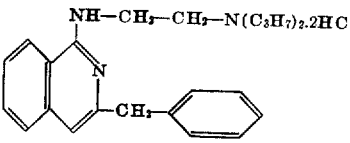

This compound was prepared using a procedure identical with that of Example 2, with the exception that an equimolar quantity of 3-benzylisoquinoline was utilized instead of 1-chloro-3-methylisoquinoline and refluxed together with an equimolar quantity of β-di-n-propylaminoethylamine instead of β-diethylaminoethylamine.

EXAMPLE 8

*1-(β-piperidinoethylamino)-3-methylisoquinoline dihydrochloride*

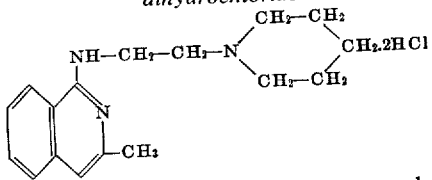

This compound was prepared using a procedure identical with that of Example 2, with the exception that an equimolar quantity of β-piperidinoethylamine was utilized in place of the β-diethylaminoethylamine and was refluxed together with 1-chloro-3-methylisoquinoline.

EXAMPLE 9

*1-(β-morpholinoethylamino)-3-methylisoquinoline dihydrochloride*

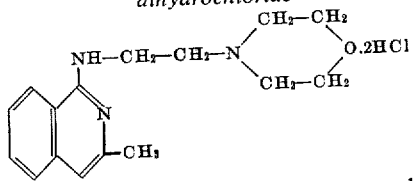

This compound was prepared using a procedure identical with that of Example 2, with the exception that an equimolar quantity of β-morpholinoethylamine was utilized in place of the β-diethylaminoethylamine and was refluxed together with 1-chloro-3-methylisoquinoline.

EXAMPLE 10

*1-(β-pyrrolidinoethylamino)-3-methylisoquinoline dihydrochloride*

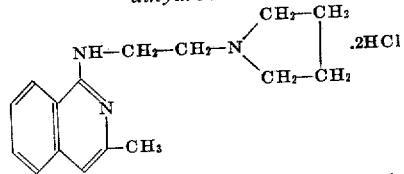

This compound was prepared using a procedure identical with that of Example 2, with the exception that an equimolar quantity of β-pyrrolidinoethylamine was utilized in place of the β-diethylaminoethylamine and was refluxed together with 1-chloro-3-methylisoquinoline.

EXAMPLE 11

*1-(β-dimethylaminoethylamino)-3-ethyl-6,7-dimethylisoquinoline dihydrochloride*

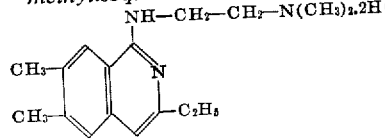

This compound was prepared using a procedure identical with that of Example 2, with the exception that an equimolar quantity of 1-chloro-3-ethyl-6,7-dimethylisoquinoline was utilized instead of 1-chloro-3-methylisoquinoline and was refluxed together with an equimolar quantity of β-dimethylaminoethylamine instead of β-diethylaminoethylamine.

EXAMPLE 12

*1-(β-dimethylaminoethylamino)-3-ethyl-6,7-dimethoxyisoquinoline dihydrochloride*

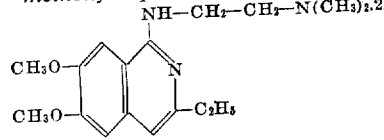

This compound was prepared using a procedure identical with that of Example 2, with the exception that an equimolar quantity of 1-chloro-3-ethyl-6,7-dimethoxyisoquinoline was utilized instead of 1-chloro-3-methylisoquinoline and was refluxed together with an equimolar quantity of β-dimethylaminoethylamine instead of β-diethylaminoethylamine.

EXAMPLE 13

*1-(β-dimethylaminoethylamino)-3-ethyl-7-aminoisoquinoline trihydrochloride*

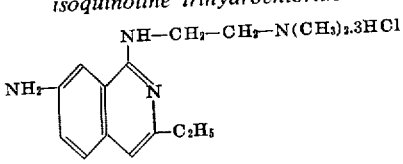

This compound was prepared using a procedure identical with that of Example 2, with the exception that an equimolar quantity of 1-chloro-3-ethyl-7-aminoisoquinoline was utilized instead of 1-chloro-3-methylisoquinoline and was refluxed together with an equimolar quantity of β-dimethylaminoethylamine instead of β-diethylaminoethylamine.

EXAMPLE 14

*1-(β-dimethylaminoethylamino)-3-ethyl-7-acetylaminoisoquinoline trihydrochloride*

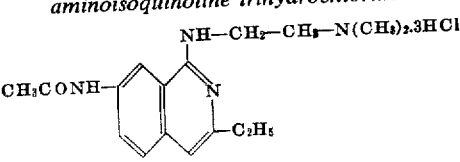

This compound was prepared using a procedure identical with that of Example 2, with the exception that an equimolar quantity of 1-chloro-3-ethyl-7-acetylaminoisoquinoline was utilized instead of 1-chloro-3-methylisoquinoline and was refluxed together with an equimolar quantity of β-dimethylaminoethylamine instead of β-diethylaminoethylamine.

EXAMPLE 15

*1-(β-dimethylaminoethylamino)-3-ethyl-7-methylaminoisoquinoline trihydrochloride*

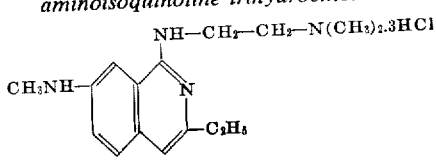

This compound was prepared using a procedure identical with that of Example 2, with the exception that an equimolar quantity of 1-chloro-3-ethyl-7-methylaminoisoquinoline was utilized instead of 1-chloro-3-methylisoquinoline and was refluxed together with an equimolar quantity of β-dimethylaminoethylamine instead of β-diethylaminoethylamine.

EXAMPLE 16

*1-(β-dimethylaminoethylamino)-3-ethyl-7-dimethylaminoisoquinoline trihydrochloride*

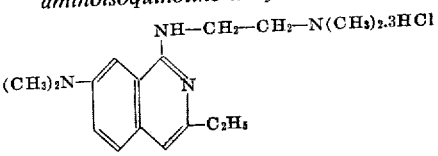

This compound was prepared using a procedure identical with that of Example 2, with the exception that an equimolar quantity of 1-chloro-3-ethyl-7-dimethylaminoisoquinoline was utilized instead of 1-chloro-3-methylisoquinoline and was refluxed together with an equimolar quantity of β-dimethylaminoethylamine instead of β-diethylaminoethylamine.

EXAMPLE 17

*1-(β-dimethylaminoethylamino)-3-ethyl-6-methyl-isoquinoline dihydrochloride*

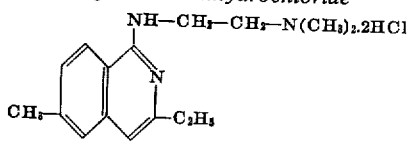

This compound was prepared using a procedure identical with that of Example 2, with the exception that an equimolar quantity of 1-chloro-3-ethyl-6-methylisoquinoline was utilized instead of 1-chloro-3-methylisoquinoline and was refluxed together with an equimolar quantity of β-dimethylaminoethylamine instead of β-diethylaminoethylamine.

EXAMPLE 18

*1-(β-di-n-propylaminoethylamino)-3-n-propylisoquinoline dihydrochloride*

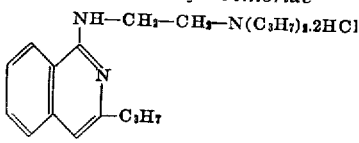

This compound was prepared using a procedure identical with that described in Example 2 above, with the exception that an equimolar amount of 1-chloro-3-n-propylisoquinoline was utilized in place of 1-chloro-3-methylisoquinoline and was refluxed together with an equimolar amount of β-di-n-propylaminoethylamine in place of β-diethylaminoethylamine.

EXAMPLE 19

*1-(β-di-n-propylaminoethylamino)-3-n-propyl-7-aminoisoquinoline trihydrochloride*

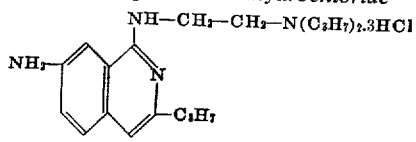

This compound was prepared using a procedure identical with that described in Example 2 above, with the exception that an equimolar amount of 1-chloro-3-n-propyl-7-aminoisoquinoline was utilized in place of 1-chloro-3-methylisoquinoline and was refluxed together with an equimolar amount of β-di-n-propylaminoethylamine in place of β-diethylaminoethylamine.

EXAMPLE 20

*1-(β-piperidinoethylamino)-3-n-propyl-6,7-dimethylisoquinoline dihydrochloride*

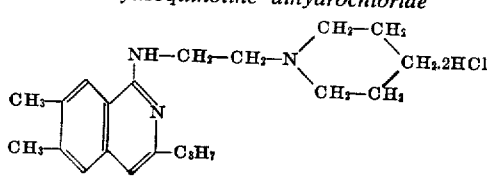

This compound was prepared using a procedure identical with that described in Example 2 above, with the exception that an equimolar amount of 1-chloro-3-n-propyl-6,7-dimethylisoquinoline was utilized in place of 1-chloro-3-methylisoquinoline and was refluxed together with an equimolar amount of β-morpholinoethylamine in place of β-diethylaminoethylamine.

EXAMPLE 21

*1-(β-morpholinoethylamino)-3-n-butylisoquinoline dihydrochloride*

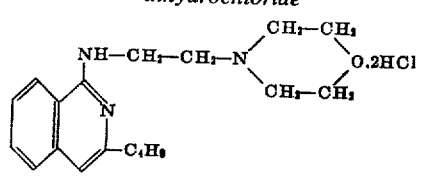

This compound was prepared using a procedure identical with that described in Example 2 above, with the exception that an equimolar amount of 1-chloro-3-n-butylisoquinoline was utilized in place of 1-chloro-3-methylisoquinoline and was refluxed together with an equimolar amount of β-morpholinoethylamine in place of β-diethylaminoethylamine.

EXAMPLE 22

*1-(β-di-n-butylamino)-3-n-butyl-6-methylisoquinoline dihydrochloride*

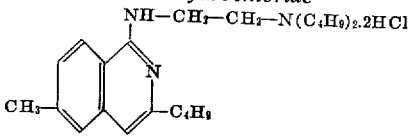

This compound was prepared using a procedure identical with that described in Example 2 above, with the exception that an equimolar amount of 1-chloro-3-n-butyl-6-methylisoquinoline was utilized in place of 1-chloro-3-methylisoquinoline and was refluxed together with an equimolar amount of β-di-n-butylaminoethylamine, in place of β-diethylaminoethylamine.

EXAMPLE 23

*1-(β - diethylaminoethylamino)-3-n-butyl-7-acetylaminoisoquinoline trihydrochloride*

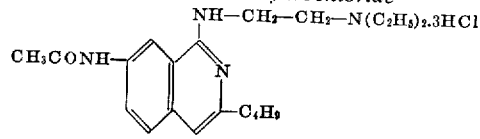

This compound was prepared using a procedure identical with that described in Example 2 above, with the exception that an equimolar amount of 1-chloro-3-n-butyl-7-acetylaminoisoquinoline was utilized in place of 1-chloro-3-methylisoquinoline and was refluxed together with diethylaminoethylamine.

EXAMPLE 24

*1-(β - diethylaminoethylamino) - 3-n-butyl-6,7-di-n-propoxyisoquinoline dihydrochloride*

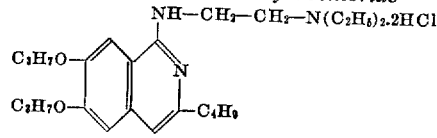

This compound was prepared using a procedure identical with that described in Example 2 above, with the exception that an equimolar amount of 1-chloro-3-n-butyl-6,7-di-n-propoxyisoquinoline was utilized in place of 1-chloro-3-methylisoquinoline and was refluxed together with diethylaminoethylamine.

EXAMPLE 25

*1-(β-diethylaminoethylamino)-3 - n - amyl - 6,7-di-n-propoxyisoquinoline dihydrochloride*

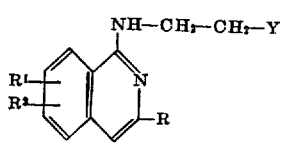

This compound was prepared using a procedure identical with that described in Example 2 above, with the exception that an equimolar amount of 1-chloro-3-n-amyl-6,7-di-n-propoxyisoquinoline was utilized in place of 1-chloro-3-methylisoquinoline and was refluxed together with diethylaminoethylamine.

What is claimed is:

1. Chemical compounds of the class consisting of a free base and its acid addition salts, the free base having the formula:

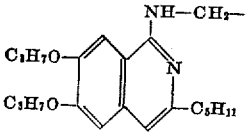

where Y is a nitrogen atom of an amino radical selected from the group consisting of di-lower-alkylamino, piperidino, morpholino and pyrrolidino; R is selected from the group consisting of lower alkyl, phenyl and benzyl radicals; and $R^1$ and $R^2$ are selected from the group consisting of H, methyl, lower alkoxy, amino, methylamino, and acetylamino radicals.

2. The compound having the following formula:

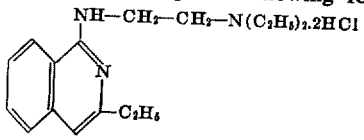

3. The compound having the following formula:

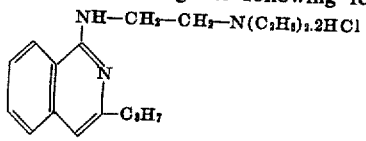

4. The compound having the following formula:

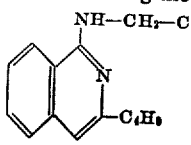

5. The compound having the following formula:

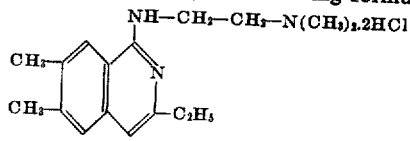

6. The compound having the following formula:

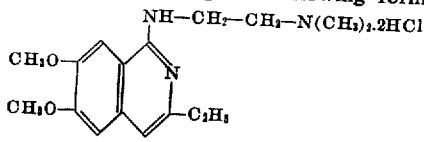

References Cited in the file of this patent

UNITED STATES PATENTS 2,593,798    Robinson _____ Apr. 22, 1952

FOREIGN PATENTS 597,816    Great Britain _____ Feb. 4, 1948

OTHER REFERENCES

Haworth et al.: J. Chem. Soc. (London), 1948, pp. 777–82.